US005327628A

United States Patent [19]

Gouda et al.

[11] Patent Number: 5,327,628

[45] Date of Patent: Jul. 12, 1994

[54] APPARATUS FOR BENDING AND HOLDING WIRE FOR WIRE END PROCESSING

[75] Inventors: Teruyuki Gouda; Toshihiro Inoue, both of Shizuoka, Japan

[73] Assignee: Yazaki Corporation, Japan

[21] Appl. No.: 98,029

[22] Filed: Jul. 28, 1993

[30] Foreign Application Priority Data

Jul. 31, 1992 [JP] Japan ................................ 4-204796

[51] Int. Cl.$^5$ ......................... B23P 23/00; B21F 1/00; H01R 43/00

[52] U.S. Cl. .................................. 29/33 F; 29/33 M; 140/102

[58] Field of Search ................ 29/33 F, 33 M, 566.1, 29/564.6, 564.8, 759, 857, 861, 863; 140/102

[56] References Cited

U.S. PATENT DOCUMENTS

| | | | |
|---|---|---|---|
| 2,976,895 | 3/1961 | Durham, Jr. | 140/102 |
| 3,638,687 | 2/1972 | Bardo | 140/102 X |
| 4,375,229 | 3/1983 | Mikami et al. | 29/753 |
| 4,638,558 | 1/1987 | Eaton | 29/33 F X |
| 4,715,099 | 12/1987 | Yoshida | 29/33 M |
| 4,793,038 | 12/1988 | Guerout et al. | 29/564.6 X |
| 4,833,778 | 5/1989 | Loustan | 29/33 F X |
| 4,852,249 | 8/1989 | Muskulus | 29/759 X |
| 4,976,294 | 12/1990 | Kudo et al. | 29/564.6 X |

FOREIGN PATENT DOCUMENTS 5339593 10/1978 Japan .

*Primary Examiner*—William Briggs

*Attorney, Agent, or Firm*—Wigman, Cohen, Leitner & Myers

[57] ABSTRACT

A wire guide member is formed with a U-shaped curved guide surface along which a recessed wire guide groove is formed. A wire supplying device is disposed an appropriate distance away from one end of the wire guide groove, and a wire end stopper is disposed another appropriate distance away from the other end of the wire guide groove, respectively. Two wire push-in plates are interposed between the wire guide member and the wire supplying device and between the wire guide member and the wire end stopper, respectively so as to be movable up and down. Further, a wire holding member for clipping the bent wire is arranged at a position lower than the wire travel line determined by the wire supplying device and the wire guide groove, so as to be movable in a direction perpendicular to the wire feed direction. Therefore, the bent wire held by the wire holding member can be shifted to the succeeding process, without moving the wire guide member for bending the wire into U-shape, thus realizing a wire bending and holding apparatus simple in structure and small in size and dimension.

8 Claims, 7 Drawing Sheets

APPARATUS FOR BENDING AND HOLDING WIRE FOR WIRE END PROCESSING

BACKGROUND OF THE INVENTION

The present invention relates to an apparatus for bending and holding wire for wire end processing, and more specifically to an apparatus for bending wire into U-shape and holding the U-shape bent wire so as to be suitable for end processing of a wire harness at the succeeding process.

A wire harness is composed of a number of wires of various different lengths. Further, the wires of the wire harness are divided into a plurality of branch portions according to the arrangement path lengths of the respective wires. A group of terminals connected to the respective wire ends of each branch portion are fitted to a connector housing, respectively.

In manufacturing the wire harness composed of a number of wires having terminals at the respective wire ends, it is advantageous to effect the wire end processing under condition that the wire ends are all trued up appropriately. Here, the wire end processing implies the manufacturing process as follows: the wire lengths are measured; the wires of measured lengths are cut off; the insulating material of the cut-off wires is removed at both ends thereof; and terminals are attached to the ends of the wires, etc.

FIGS. 1A and 1B show an example of conventional apparatus for bending, holding and further conveying U-shape bent wires, which is disclosed in Japanese Examined (KoKoKu) Patent Publication No. 53-39593. As shown in FIG. 1A, this conventional apparatus comprises a jig body a and a guide plate b formed with an inner U-shaped guide groove c. With the use of this conventional apparatus, the wire is processed as follows: a wire W is first let out along the U-shaped groove c formed between the jig body a and the guide plate b; the let-in side of the wire is clamped by a clamper $d_1$; the guide plate b formed with the inner U-shaped guide groove c is removed upward away from the jig body a, as shown in FIG. 1B; the wire W is further let out to a predetermined wire length as shown in FIG. 1B; the other let-out end of the bent wire is clamped by another clamp $d_2$; the wire is cut off to true up both ends $W_0$ and $W_0$ of the U-shaped bent wire; and the bent wire W' of a predetermined length is further conveyed toward a wire end processing machine (not shown) together with the jig body a.

In the conventional apparatus for bending and holding wire as described above, however, since the bent wire W' of a predetermined length is conveyed to the succeeding process together with the jig body, a great number of jig bodies a are inevitably required for wire end processing, continuously, thus causing a problem in that the wire processing machine is complicated in structure and large in size and volume.

SUMMARY OF THE INVENTION

Accordingly, the object of the present invention is to provide an apparatus for bending and holding wire for wire end processing, which is simple in structure and small in size and by which bent wire can be conveyed to the succeeding process without conveying the U-shape bending apparatus itself.

To achieve the above-mentioned object, the present invention provides an apparatus for bending and holding a wire for wire end processing, comprising: a wire guide member formed with a curve guide surface along which a wire guide groove is formed; a wire supplying device disposed at a predetermined distance away from said wire guide member, for supplying the wire to one end of said wire guide groove; a stopper disposed another predetermined distance away from said wire guide member, for stopping an end of the wire bent along the wire guide groove and fed out from the other end of the wire guide groove; wire push-in members interposed between said wire guide member and said wire supplying device and between said wire guide member and said stopper, respectively so as to be movable in a direction perpendicular to a wire travel line determined by said wire supplying device and said wire guide member, for removing the wire from said wire guide member; and a wire holding member for holding the wire removed from said wire guide member at a position away from the wire travel line, said wire holding member being movable after having held the bent wire.

In a preferred embodiment, the wire guide groove is formed along a beveled edge portion of the curved guide surface, and a shutter is disposed so as to open and close one side surface of the wire guide groove.

In the apparatus according to the present invention constructed as described above, the wire supplied at high speed by the wire supplying device enters one end of the groove formed in the curved guide surface of the wire guide member, guided along the curved groove wall and therefore bent into U-shape, and then fed out of the other end of the wire guide groove. In the above-mentioned U-shape wire bending process, the wire is bent under pressure contact with the groove wall due to a centrifugal force of the wire supplied at high speed.

The end of the fed-out wire is stopped when brought into contact with the stopper. Simultaneously, the wire end is clamped by the wire holding member at the let-out side by moving downward the wire push-in member, so that the wire is released free from the wire guide groove of the wire guide member. Thereafter, the wire supplying device is actuated again to let out the wire by a predetermined length, and the wire is clamped at the let-in side by the wire holding member by moving downward the wire push-in member. The clamped wire is cut off by the wire cutter. Since the wire holding member is located a distance away from the wire travel level, the wire holding member can be moved to the succeeding process. By repeating the above-mentioned process, wires of predetermined length whose both ends are trued up can be produced continuously.

Further, when the lower edge portion of the curved guide surface of the wire guide groove is beveled downward and further a shutter member is provided so as to cover the lower bottom portion of the curved guide surface, since the wire can be securely supported by the wire guide groove until the wire is clamped at the let-out side of the wire, without being dislodged from the wire guide groove, it is possible to freely increase the wire supplying speed of the wire supplying device, thus enabling a high speed wire bending process.

DETAILED DESCRIPTION OF THE PREFERRED EMBODIMENTS

Figure 1A:
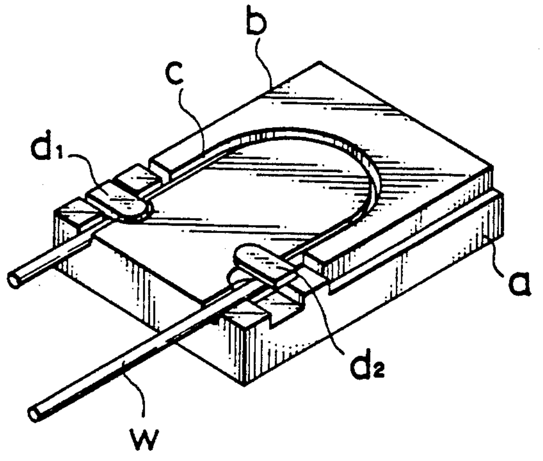
FIG. 1A PRIOR ART
FIG. 1A is a perspective view showing a conventional apparatus for bending wire into U-shape, in which the wire has been already bent into u-shape
Figure 1B:
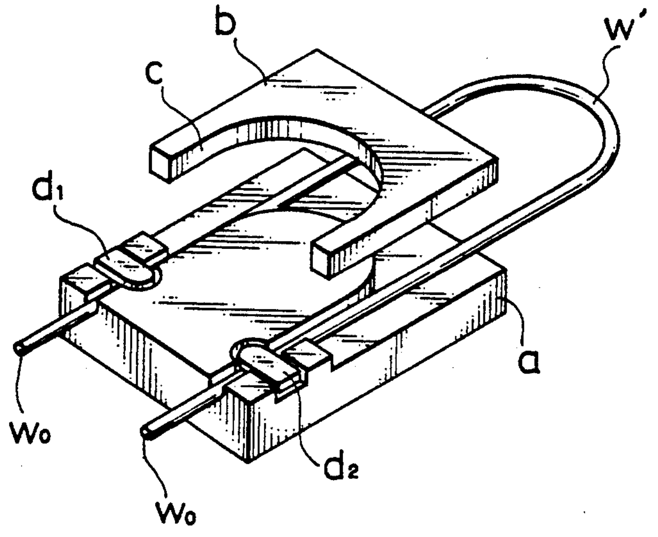
FIG. 1B PRIOR ART
FIG. 1B is a perspective view showing the same conventional apparatus shown in FIG. 1A, in which the wire length is being measured.
Figure 2:
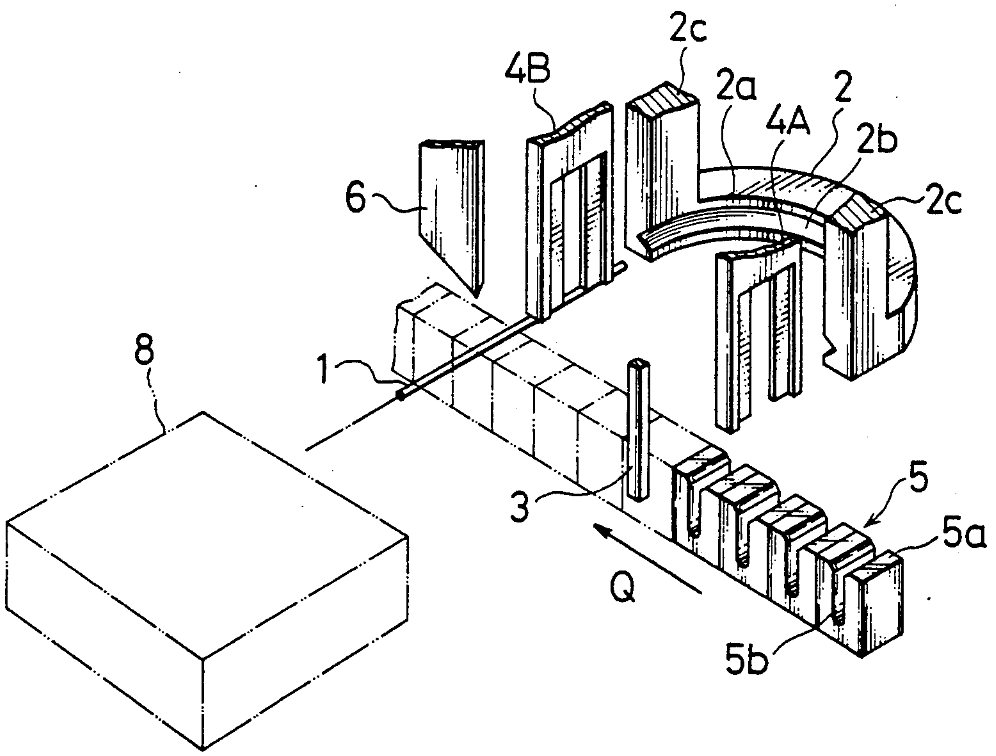
FIG. 2 is a perspective view showing a first embodiment of the wire bending and holding apparatus according to the present invention.

With reference to FIGS. 2 to 4, a first embodiment of the apparatus according to the present invention will be described hereinbelow.

In FIG. 2, a wire 1 is let out from a wire supplying device 8 under the condition that the wire length is always measured. The apparatus of the present embodiment comprises a wire guide member 2, a wire stopper 3, two wire push-in plates 4A and 4B, a wire holding member 5, and a wire cutter 6.

The wire guide member 2 is formed with an inner U-shaped guide surface 2*a*. A V-shaped or U-shaped cross-section wire guide groove 2*b* is formed in the inner circumferential surface of the inner U-shaped guide surface 2*a*. Further, the wire guide member 1 is fixed to a frame (not shown) by two vertical posts 2*c* formed integral with the guide member 2 at both side ends thereof. The wire supplying device 8 is disposed a predetermined distance away from the wire guide member 2 so as to face one end (wire let-in side) of the wire guide groove 2*b*. An example of the wire supplying apparatus is disclosed in U.S. Pat. No. 4,375,229, for instance, which is therefore incorporated by reference herein.

The wire stopper 3 is used to stop the end of the wire let out along and from the wire guide groove 2*b* and to detect the wire end. The wire stopper 3 is disposed a predetermined distance away from the wire guide member 2 so as to face the other end (wire let-out side) of the wire guide groove 2*b*.

The wire push-in plates 4A and 4B are disposed between one end of the wire guide groove 2*b* and the wire supplying device 8 and between the other end of the wire guide groove 2*b* and the stopper 3, respectively. The wire push-in plates 4A and 4B are both movable up and down to push the wire. In more detail, the wire push-in plates 4A and 4B both can be moved up and down in the direction perpendicular to the wire travel line determined by the wire supplying device 8 and the wire guide groove 2*b*.

The wire holding member 5 is formed with a plurality of series arranged wire clips 5*a*. Each of the wire clip 5*a* is formed of plastic and with an upward opening wire clipping slit 5*b*. Here, these wire holding member 5 is located below the wire 1. In more detail, the upper end surface of the wire clips 5*a* are arranged below the wire travel level L (shown in FIG. 4A) determined by the wire supply device 8 and the wire guide groove 2*b*, preferably by a vertical distance of about the outer wire diameter away from the wire travel level L. Further, the wire holding member 5 is shifted intermittently in the direction Q (shown in FIG. 2) which is perpendicular to the wire supply direction.

The wire cutter 6 is disposed on the wire let-in side of the wire guide groove 2*b* roughly the same distance away from the wire guide groove 2*b* as the wire stopper 3. The wire cutter 6 can be of course movable up and down to cut off the wire 1.

With reference to FIGS. 3A to 3D and FIGS. 4A to 4D, the procedure of U-shape bending, cutting and conveying the wire 1 will be described hereinbelow. In these drawings, the wire push-in plates 4A and 4B and the wire cutter 6 are shown by phantom lines when moved to the upper positions, and by solid lines when moved to the lower positions, respectively.

Figure 3A:
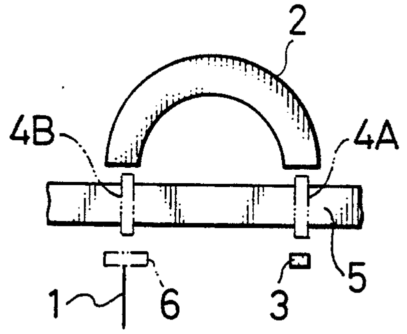
FIGS. 3A to 3D are plan views for assistance in explaining the process of bending wire into U-shape with the use of the apparatus shown in FIG. 2.
Figure 3B:
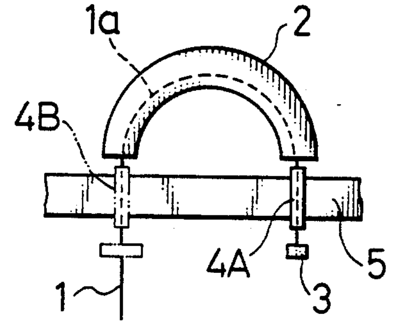
Figure 3C:
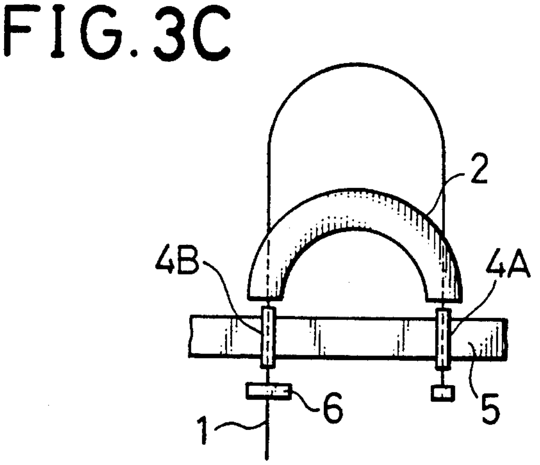
Figure 4A:
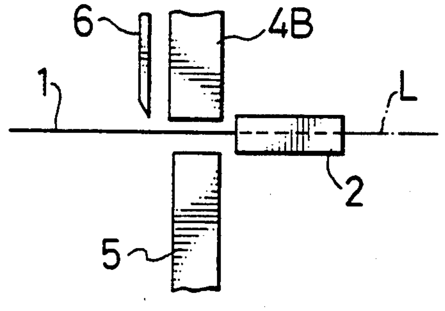
FIGS. 4A to 4D are side views for assistance in explaining the process of bending wire into U-shape with the use of the apparatus shown in FIG. 2, which correspond to FIGS. 3A to 3D, respectively.
Figure 4B:
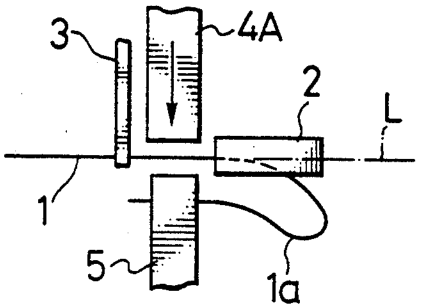
Figure 4C:
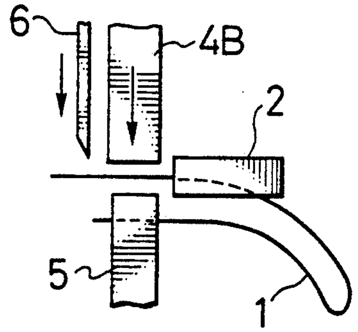

At the first step, an end of a wire 1 is located under the wire cutter 6 moved upward (as shown in FIGS. 3A and 4A). Then, the wire 1 is let out from the wire supplying device 8 to allow an end of the wire 1 to enter the wire guide groove 2*b* from the let-in side of the wire guide member 2, travel along the groove guide surface 2*a*, come out from the let-out side of the wire guide member 2, and reach the wire stopper 3 moved downward (as shown in FIGS. 3B and 4B). Immediately after the end of the wire 1 has been brought into contact with the wire stopper 3, the end of the wire 1 is pushed into the wire clipping slit 5*b* of the wire clip 5*a* by moving downward the wire push-in plate 4A (as shown in FIGS. 3B and 4B). Under these conditions, the end of the wire 1 is held by the wire clipping slit 5*b* and simultaneously the U-shaped bent portion 1*a* (shown in FIGS. 3B and 4B) of the wire 1 held by the wire guide groove 2*b* is removed downward free from the wire guide member 2 (as shown in FIG. 4B). Under the condition that the end of the wire 1 is kept held by the wire clip 5*a*, the wire 1 is further let out by a predetermined length by driving the wire supplying device 8. Thereafter, the wire 1 is cut off by moving the wire cutter 6 downward and simultaneously the end of the wire 1 is push into another wire clip 5*a* by moving downward another wire push-in plate 4B (as shown in FIGS. 3C and 4C).

Figure 3D:
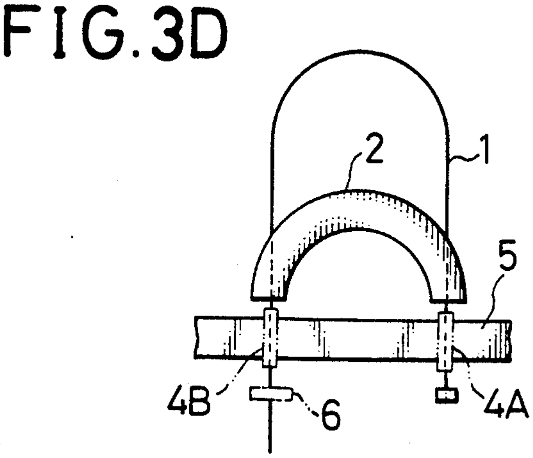
Figure 4D:
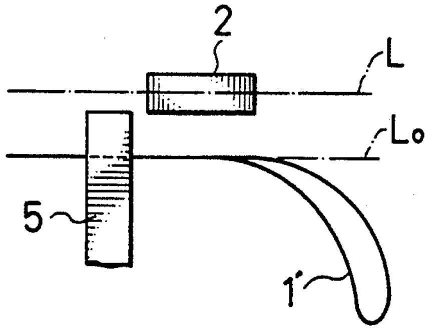

FIGS. 3D and 4D show the state where the wire 1 has been bent into U-shape by the wire guide member 2, cut off by the wire cutter 6, and further held by the two wire holding members 5, in which the wire cutter 6 and the two push-in members 4A and 4B are all moved to the upward positions, respectively. Under these conditions, it should be noted that the level $L_0$ at which the wire is held by the wire holding member 5 is lower than the level L at which the wire is let out, as shown in FIG. 4D. Accordingly, the wire 1′ bent into a U-shape and let out into a predetermined length and further held by the wire holding member 5 can be fed from the current wire bending and holding apparatus to the succeeding wire bending and holding apparatus, by shifting the wire holding member 5 by a predetermined pitch in the arrow direction Q (shown in FIG. 2).

Further, the wire 1 can be bent into U-shape and further cut off into a predetermined length continuously, by repeating the above-mentioned steps as described with reference to FIGS. 3A and 4A to FIGS. 3D and 4D.

Figure 5:
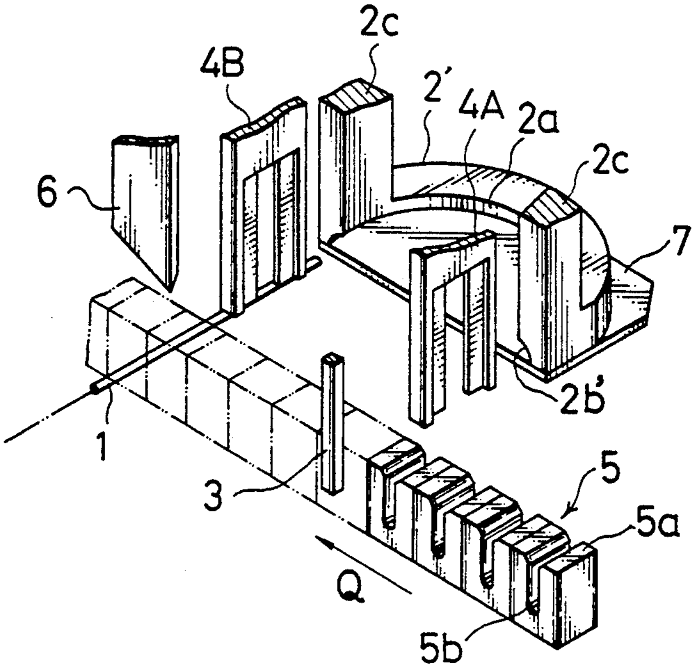
FIG. 5 is a perspective view showing a second embodiment of the wire bending and holding apparatus according to the present invention.

FIG. 5 is a perspective view showing a second embodiment of the wire bending and holding apparatus according the present invention. The points different between the first embodiment shown in FIG. 2 and the second embodiment shown in FIG. 5 are as follows: in this second embodiment, the wire guide member 2' is formed with wire guide groove 2b' beveled downward along the lower edge portion of the U-shaped guide surface 2a of the guide member 2' and in addition a shutter member 7 is provided so as to open and close the bottom portion of the wire guide member 2'.

In the second embodiment as described above, the wire 1 can be securely held by the shutter member 7 when being bent into U-shape along the wire guide groove 2b', until the end of the wire 1 reaches the wire stopper 3, without being dislodged from the wire guide groove 2b', so that it is possible to increase the wire supplying speed of the wire supplying device 8 and therefore the wire bending productivity can be further improved.

With reference to FIGS. 6A to 6E, the procedure of U-shape bending, cutting and conveying the wire 1 will be described hereinbelow. Similarly, the wire push-in plates 4A and 4B and the wire cutter 6 are shown by phantom lines when moved to the upper positions, and by solid lines when moved to the lower positions, respectively.

Figure 6A:
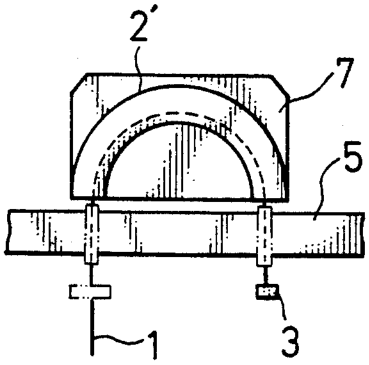
FIGS. 6A to 6E are plan views for assistance in explaining the process of bending wire into U-shape with the use of the apparatus shown in FIG. 5.
Figure 6B:
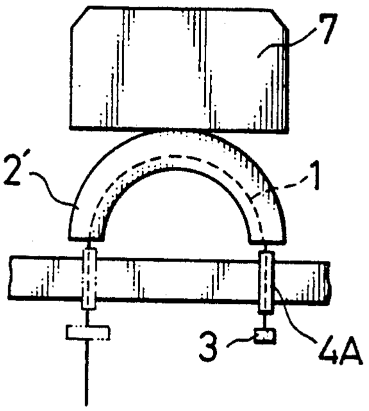
Figure 6C:
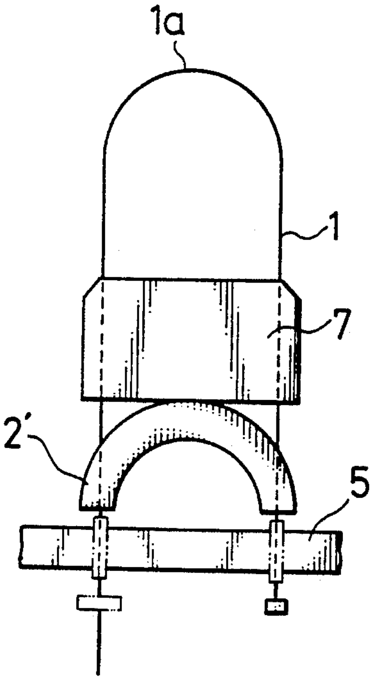
Figure 6D:
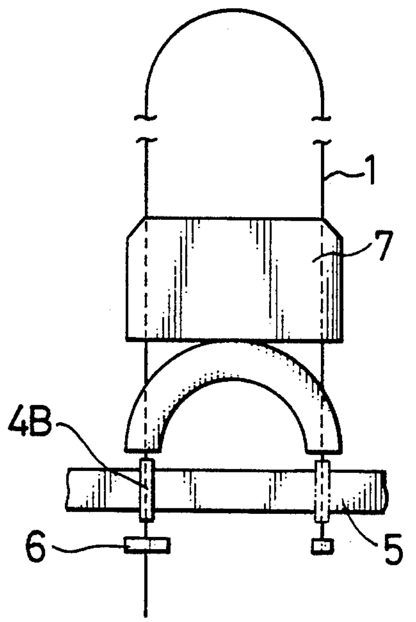

First, the bottom of the wire guide member 2' is kept closed by the shutter member 7. Under these conditions, an end of a wire 1 is located under the wire cutter 6 moved upward, and further let-out into the wire guide member 2' to bend the wire 1 into U-shape (as shown in FIG. 6A). Immediately after the end of the wire 1 has been brought into contact with the wire stopper 3, the end of the wire 1 is pushed down into the wire clipping slit 5b of the wire clip 5a by moving downward the wire push-in plate 4A, so that the bent wire 1 is removed from the wire guide member 2'. Further, the shutter 7 is moved away from the bottom of the wire guide member 2' (as shown in FIG. 6B). Under the condition that the end of the wire 1 is kept held by the wire clip 5a, the wire 1 is further let out by a predetermined length by driving the wire supplying device 8 (as shown in FIG. 6C), in which the push-in member 4B is moved upward. After the wire 1 has been let out by a predetermined length, the wire 1 is cut off by moving the wire cutter 6 downward and simultaneously the end of the wire 1 is push into another wire clip 5a by moving downward another wire push-in plate 4B (as shown in FIG. 6D).

Figure 6E:
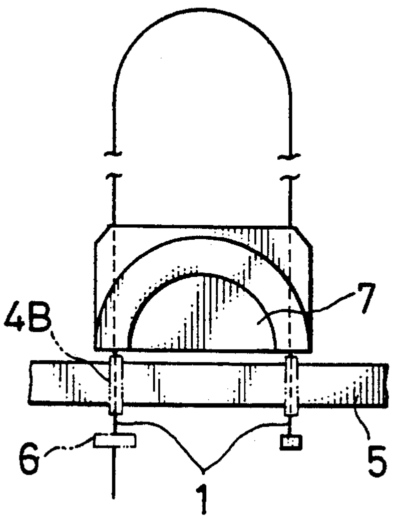

Finally, the wire guide member 2' is closed by the shutter member 7; the wire push-in plate 4B is moved upward; and the wire holding member 5 is shifted by a predetermined pitch in the arrow direction Q (shown in FIG. 5) under the condition as shown in FIG. 6E, so that the apparatus returns to the original state (as shown in FIG. 6A).

Therefore, the wire 1 can be bent into U-shape, cut off into a predetermined length, and further conveyed to the succeeding step continuously, by repeating the above-mentioned steps as described with reference to FIGS. 6A to 6E, in the same way as with the case of the first embodiment.

In the above-mentioned embodiments, the wire guide member 2 or 2' is formed into a U-shape body. Without being limited to this U-shaped body, it is of course possible to form the wire guide member 2 or 2' into a square plate with an appropriate thickness, as far as the curved guide surface 2a can be formed in the square plate and at least one side of the plate is formed open. Further, the wire holding member 5 can be formed by an endless belt or an endless chain which can hold the wire, as far as the both ends of the wire whose length has been measured can be fixed at a predetermined pitch (as disclosed in U.S. Pat. No. 4,375,229).

As described above, in the wire bending and holding apparatus according to the present invention, since the wire travel level at which the wire is bent into U-shape and before one end of the wire is fixed is offset from the wire fixing level at which both ends of the bent wire are fixed, it is possible to shift the bent wire held by the wire holding member to the succeeding process, without moving the wire guide member for bending the wire into U-shape, with the result that the wire bending and holding apparatus according to the present invention can be simplified in structure and reduced in size and dimension.

What is claimed is:

1. An apparatus for bending and holding a wire for wire end processing, comprising:

a wire guide member formed with a curved guide surface along which a wire guide groove is formed;

a wire supplying device disposed at a predetermined distance away from said wire guide member, for supplying the wire to one end of said wire guide groove;

a stopper disposed another predetermined distance away from said wire guide member, for stopping an end of the wire bent along the wire guide groove and fed out from the other end of the wire guide groove;

wire push-in members interposed between said wire guide member and said wire supplying device and between said wire guide member and said stopper, respectively and movable in a direction perpendicular to a wire travel line determined by said wire supplying device and said wire guide member, for removing the wire from said wire guide member; and a wire holding member for holding the wire removed from said wire guide member at a position away from the wire travel line, said wire holding member being movable after having held the wire.

2. The apparatus of claim 1, wherein the curved guide surface of said wire guide member is formed into a U-shape.

3. The apparatus of claim 1, wherein a cross section of the wire guide groove is formed into U-shape.

4. The apparatus of claim 1, wherein a cross section of the wire guide groove is formed into V-shape.

5. The apparatus of claim 1, wherein said wire holding member is movable in a direction perpendicular to the wire travel line.

6. An apparatus for bending and holding a wire for wire end processing, comprising:

a wire guide member formed with a curved guide surface along which a wire guide groove is formed;

a shutter movably disposed so as to open and close one side of the curved guide surface;

a wire supplying device disposed a predetermined distance away from said wire guide member, for supplying the wire from one end of said wire guide groove;

a stopper disposed another predetermined distance away from said wire guide member, for stopping an end of the wire bent along the wire guide groove and fed out from the other end of the wire guide groove;

wire push-in members interposed between said wire guide member and said wire supplying device and between said wire guide member and said stopper, respectively and movable in a direction perpendicular to a wire travel line determined by said wire supplying device and said wire guide member, for removing the wire from said wire guide member; and a wire holding member for holding the wire removed from said wire guide member at a position away from the wire travel line, said wire holding member being movable after having held the wire.

7. The apparatus of claim 6, wherein the curved guide surface of said wire guide member is formed into a U-shape.

8. The apparatus of claim 6, wherein said wire holding member is movable in a direction perpendicular to the wire travel line.

* * * * *